United States Patent
United States Patent
Grossman et al.

(10) Patent No.: US 8,611,740 B2
(45) Date of Patent: Dec. 17, 2013

(54) SYSTEM AND METHOD FOR PROTECTING AN EXTENDED PASSIVE OPTICAL NETWORK

(75) Inventors: Daniel B. Grossman, Wellesley, MA (US); Ruoding Li, Carlisle, MA (US); Derek Nesset, Colchester (GB)

(73) Assignee: Motorola Mobility LLC, Libertyville, IL (US)

( * ) Notice: Subject to any disclaimer, the term of this patent is extended or adjusted under 35 U.S.C. 154(b) by 782 days.

(21) Appl. No.: 12/389,508

(22) Filed: Feb. 20, 2009

(65) Prior Publication Data

US 2009/0214222 A1  Aug. 27, 2009

Related U.S. Application Data

(60) Provisional application No. 61/030,654, filed on Feb. 22, 2008.

(51) Int. Cl.
*H04B 10/08* (2006.01)
(52) U.S. Cl.
USPC ............. 398/19; 398/18; 398/12; 398/11; 398/6
(58) Field of Classification Search
USPC ............. 398/1, 2, 3, 4, 5, 6, 7, 8, 12, 19, 135, 398/136, 138, 139, 128, 130, 18, 11, 13, 14, 398/20, 28, 33, 37, 67, 71, 72, 58, 62, 64, 398/66
See application file for complete search history.

(56) References Cited

U.S. PATENT DOCUMENTS 5,327,275 A * 7/1994 Yamane et al. ............ 398/2
(Continued)

FOREIGN PATENT DOCUMENTS

| EP | 1263153 A2 | 4/2002 |
|---|---|---|
| EP | 2053762 A1 | 4/2009 |
| JP | 61134133 A | 6/1986 |
| JP | 2004104182 A | 4/2004 |

OTHER PUBLICATIONS

PCT International Search Report, Re: PCT Application #PCT/US2009/034816 Feb. 23, 2009.
Office Action, Great Britain App. No. GB1013678.6; Mar. 8, 2012.

(Continued)

*Primary Examiner* — M. R. Sedighian

(57) ABSTRACT

Extender apparatus for an optical network includes first and second extender units having an network-facing port for connection to a backhaul fiber and a subscriber-facing port for connection to a feeder fiber. Each extender unit includes a gain assembly and is operable selectively either in an enabled state, in which the gain assembly amplifies a signal received at either port of the extender unit and couples it to the other port of the extender unit, or in a disabled state, in which the gain assembly blocks coupling of a signal from either port of the extender unit to the other port of the extender unit. A failover unit is operable when the first extender unit is in the enabled state and the second extender unit is in the disabled state to detect occurrence of at least one fault condition in the first extender unit. The failover unit is responsive to the fault condition in the first extender unit to switch the first extender unit to the disabled state and the second extender unit to the enabled state.

14 Claims, 2 Drawing Sheets

(56) References Cited

U.S. PATENT DOCUMENTS

| | | | |
|---|---|---|---|
| 5,689,355 A * | 11/1997 | Okubo et al. | 398/116 |
| 6,980,357 B2 | 12/2005 | Jasti et al. | |
| 2002/0080445 A1 * | 6/2002 | Falkenstein et al. | 359/127 |
| 2003/0059158 A1 | 3/2003 | Lacey | |
| 2007/0154212 A1 | 7/2007 | Ruchet et al. | |
| 2007/0154219 A1 | 7/2007 | Feinberg | |
| 2007/0183779 A1 | 8/2007 | Bouda et al. | |

OTHER PUBLICATIONS

"A Broadband Optical Access System with Enhanced Survivability: Series G: Transmission Systems and Media, Digital Systems and Networks, Digital Sections and Digital Line System—Optical Line Systems for Local and Access Networks", Telecommunication Standardization Sector of ITU, ITU-T Recommendation G.983.5, Jan. 2002.

Great Britain Office Action for GB1013678.6, dated Sep. 12, 2012.

* cited by examiner

SYSTEM AND METHOD FOR PROTECTING AN EXTENDED PASSIVE OPTICAL NETWORK

CROSS-REFERENCE TO RELATED APPLICATION

This application claims benefit under 35 USC 119 of Provisional Application No. 61/030,654 filed Feb. 22, 2008, the entire disclosure of which is hereby incorporated by reference herein for all purposes.

BACKGROUND OF THE INVENTION

The subject matter disclosed in this application relates to a system and method for protecting an extended passive optical network (PON).

Network operators deliver Internet, television and telephone services to consumers using fiber-to-the-premises (FTTP) architectures. Many of these deployments have used PON, rather than point-to-point access networks.

Referring to FIG. 1 of the drawings, an Optical Line Termination (OLT) 10 in a telephone company central office connects to service platforms, such as Internet broadband network gateways (BBNG), Internet Protocol Television servers, and Voice over IP gateways, typically via a metro network 12, and a PON connects the OLT 10 to Optical Network Terminations (ONTs) 14. In typical single family dwelling units, the ONT is located in or attached to the exterior of the home. In typical multifamily dwelling units, the ONT is located in a common utility space or located inside individual living units. In either case, the ONT derives service interfaces, such as Ethernet, cable television and analog phone, from the signal on the PON.

The PON comprises a feeder fiber 16 that connects the OLT to a passive remote node that includes an optical power splitter 18. Typically, the splitter has a split ratio of 16:1, 32:1 or perhaps 64:1, depending on the optical power budget of the network. The fan-out ports of the splitter are connected to distribution fibers 22, each of which is further connected to an ONT 14 via a drop fiber (not separately shown).

Under current industry practice, such a network may utilize an optical carrier at 1490 nm for downstream communication (i.e. transmission of bitstreams from the OLT to the customers' ONTs) and may utilize an optical carrier at 1310 nm for upstream communication (i.e. transmission of bitstreams from the customers' ONTs to the OLT).

The total reach of the PON, i.e., the maximum of the sum of the length of the feeder, distribution and drop fibers, is determined by the optical power budget of the system and the split ratio of the optical splitter. For example, ITU-T Recommendation G.984.2amd1 specifies an optical power budget of 28 dB. This equates to 20 km reach with a 32:1 split ratio, or 10 km reach with a 64:1 split ratio. While 20 km reach is adequate for many deployments, a network operator often needs a longer reach. For example, homes in rural areas might not be within 20 km of a central office. Further, a network operator may wish to reduce the number of central offices in its network so as to eliminate cost.

As shown schematically in FIG. 2, the effective reach of a PON may be extended by connecting the OLT to the upstream end of the feeder fiber 16 through a backhaul fiber 30 and an extender 26 including gain elements 32 which produce optical gain and thereby increase the optical power budget of the PON. The upstream and downstream signals are separated by wavelength division multiplexers 34. One or both gain elements may be implemented by a semiconductor optical amplifier (SOA). An SOA is enabled by applying bias current to the SOA, in which case the SOA exhibits gain; it is disabled by removing bias current from the SOA, in which case the SOA exhibits a high extinction ratio. Alternatively, one or both gain elements may be a doped fiber amplifier, such as an erbium doped fiber amplifier, which may be enabled by applying bias current to the pump laser, in which case the amplifier exhibits gain; it may be disabled by removing bias current from the pump laser, in which case the doped fiber absorbs light. A third possibility is to implement one or both gain elements with an optical to electrical to optical (OEO) regenerator, which recovers the optical signal, converts it to electrical form, possibly recovers and regenerates timing, converts the electrical signal back to optical form, and transmits the regenerated optical signal. An OEO may be enabled by completing the transmit path in the regenerator, including its receiver, clock/data recovery, buffering and transmitter, and may be disabled by turning off any part of the transmit path (but most conveniently the transmit laser).

The resiliency of an extended PON is a concern for network operators. Vulnerability of fiber to breakage, e.g., due to accidental dig-ups, is roughly proportional to its length, and an extended PON by definition has longer fiber sections than a standard PON. Further, an amplified PON may serve more subscribers than a standard PON or a regenerator extended PON and these additional subscribers constitute a larger shared risk group. Further, recent events have heightened sensitivity to the time required to restore service in the event of loss of a central office, e.g., due to a flood, fire or act of terrorism; at the same time, if a network operator attempts to reduce the number of central offices in its network, a larger number of subscribers will be served from each central office. Thus, it is desirable to provide a protection scheme that will protect against failure of at least the feeder fiber, the backhaul fiber, the extender, and the OLT.

A protected extended PON may comprise a plurality of ONTs, with drop and distribution fibers, and a remote node, as in a standard PON; and a working entity and a protection entity, wherein each entity of the working and protection pair comprises an OLT, a backhaul fiber, an extender unit, and a feeder fiber. The two feeder fibers may be diversely routed; the two backhaul fibers may be diversely routed; and the two OLTs may be located in the same central office or in different central offices.

The two feeder fibers feed respective fan-in ports of a 2:N optical power splitter. Advantageously, optical power is distributed equally in the downstream direction from each fan-in port, and equally in the upstream direction to each fan-in port; thus, there is no optical power penalty to, e.g., a 2:64 power splitter relative to a 1:64 power splitter However, a problem arises with such a topology. The 2:N splitter is an entirely passive device, and thus signals from both OLTs pass through it to the ONTs. If there were two such signals, they would mutually interfere. Thus, it is necessary to ensure that downstream signals from only one OLT at a time reach the splitter. This may be accomplished by ensuring that only one OLT of the working and protection pair is enabled at a time and either disabling or suppressing the downstream signal of the other OLT. The enabled and disabled states must be reversed in the event that a fault is detected, but only if the protection entity is intact.

ITU-T Recommendation G.983.5 describes several protection schemes for unextended PONS. Type B protection protects the feeder and OLT line terminations, but not the ONTs. Type C protection also protects ONTs, and thus solves a different problem. Notably, working and protection OLT line terminations must be in the same chassis. This means that no protection is provided in the event of loss of a central office.

Past approaches to the problem of protecting an unextended PON have used line terminations within a single OLT chassis and have been coordinated by local mechanisms within the chassis. Extending the problem to OLTs which are not collocated raises the problem of coordination between potentially distant chassis. An extended PON creates the possibility of various failure modes, which could lead to false detection of a fault or failure to detect a fault in a working PON. For example, if the protection OLT were to simply perform protection switching when it detected a loss of signal from the PON, a fault in the upstream path of the protection extender would result in a false detection. Similarly, if the protection OLT were to depend upon a failure signal from the working OLT to determine a failure, then a fault in the communication path between the two OLTs would result in either failure to detect a subsequent fault in the PON, or immediate false detection. A person sufficiently skilled in the art of protocol design may be able to identify and devise ways to remedy these problems but the resulting mechanism may be complex and unwieldy in ways that may create exposure to implementation defects.

If fault detection is located in the OLT, faults that affect one direction of transmission in the extender cannot be detected.

SUMMARY OF THE INVENTION

In accordance with a first aspect of the disclosed subject matter there is provided extender apparatus for an optical network, comprising a first extender unit having an network-facing port for connection to a first backhaul fiber and a subscriber-facing port for connection to a first feeder fiber and including a first gain assembly, the first extender unit being operable selectively either in an enabled state, in which the first gain assembly amplifies a signal received at either port of the first extender unit and couples it to the other port of the first extender unit, or in a disabled state, in which the first gain assembly blocks coupling of a signal from either port of the first extender unit to the other port of the first extender unit, a second extender unit having an network-facing port for connection to a second backhaul fiber and a subscriber-facing port for connection to a second feeder fiber and including a second gain assembly, the second extender unit being operable selectively either in an enabled state, in which the second gain assembly amplifies a signal received at either port of the second extender unit and couples it to the other port of the second extender unit, or in a disabled state, in which the second gain assembly blocks coupling of a signal from either port of the second extender unit to the other port of the second extender unit, and a failover unit that is operable when the first extender unit is in the enabled state and the second extender unit is in the disabled state to detect occurrence of at least one fault condition in the first extender unit, the failover unit being responsive to said fault condition in the first extender unit to switch the first extender unit to the disabled state and the second extender unit to the enabled state.

In accordance with a second aspect of the disclosed subject matter there is provided an optical network comprising first and second backhaul fibers each having an network-facing end for coupling to an optical line termination and also having a subscriber-facing end, first and second feeder fibers each having a subscriber-facing end for coupling to at least one optical network termination and also having an network-facing end, first and second extender units having respective network-facing ports coupled to the downstream ends of the first and second backhaul fibers respectively and respective subscriber-facing ports coupled to the upstream ends of the first and second feeder fibers respectively, and each extender unit including a gain assembly and being operable selectively either in an enabled state, in which the gain assembly amplifies a signal received at either port of the extender unit and couples it to the other port of the extender unit, or in a disabled state, in which the gain assembly blocks coupling of a signal from either port of the extender unit to the other port of the extender unit, and a failover unit that is operable when the first extender unit is in the enabled state and the second extender unit is in the disabled state to detect occurrence of at least one fault condition in the first extender unit, the failover unit being responsive to said fault condition in the first extender unit to switch the first extender unit to the disabled state and the second extender unit to the enabled state.

In accordance with a third aspect of the disclosed subject matter there is provided a computer readable medium containing instructions that, when executed by a computer that operates as a failover unit in optical network extender apparatus and receives a signal indicating occurrence of a fault condition in the working extender unit of a working and protection pair of extender units, causes the failover unit to issue signals causing the working extender unit to switch to a disabled state and the protection extender unit to switch to an enabled state.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
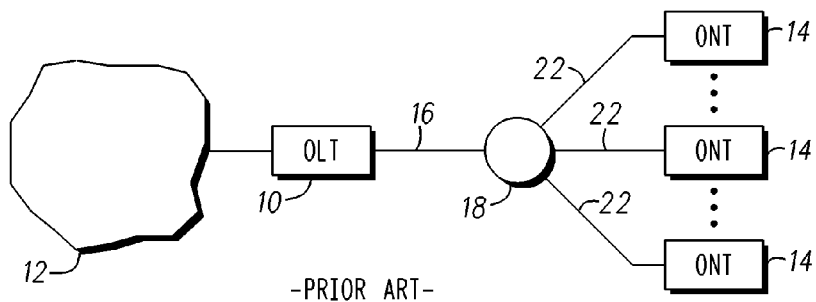
FIG. 1 is a simplified block schematic diagram of a passive optical network (PON)
Figure 2:
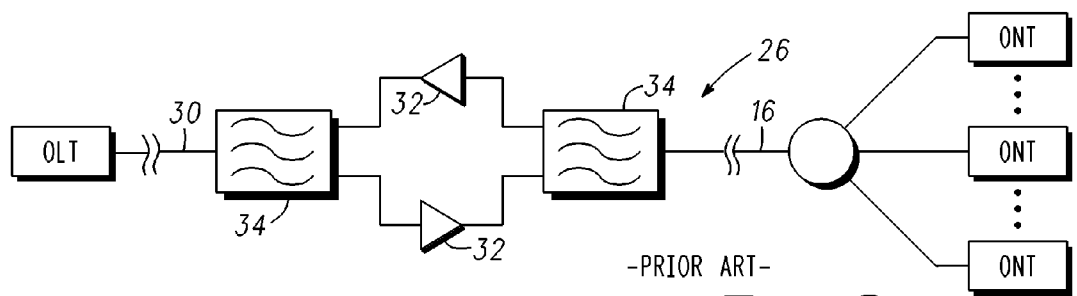
FIG. 2 is a simplified schematic block diagram of an extended PON.
Figure 3:
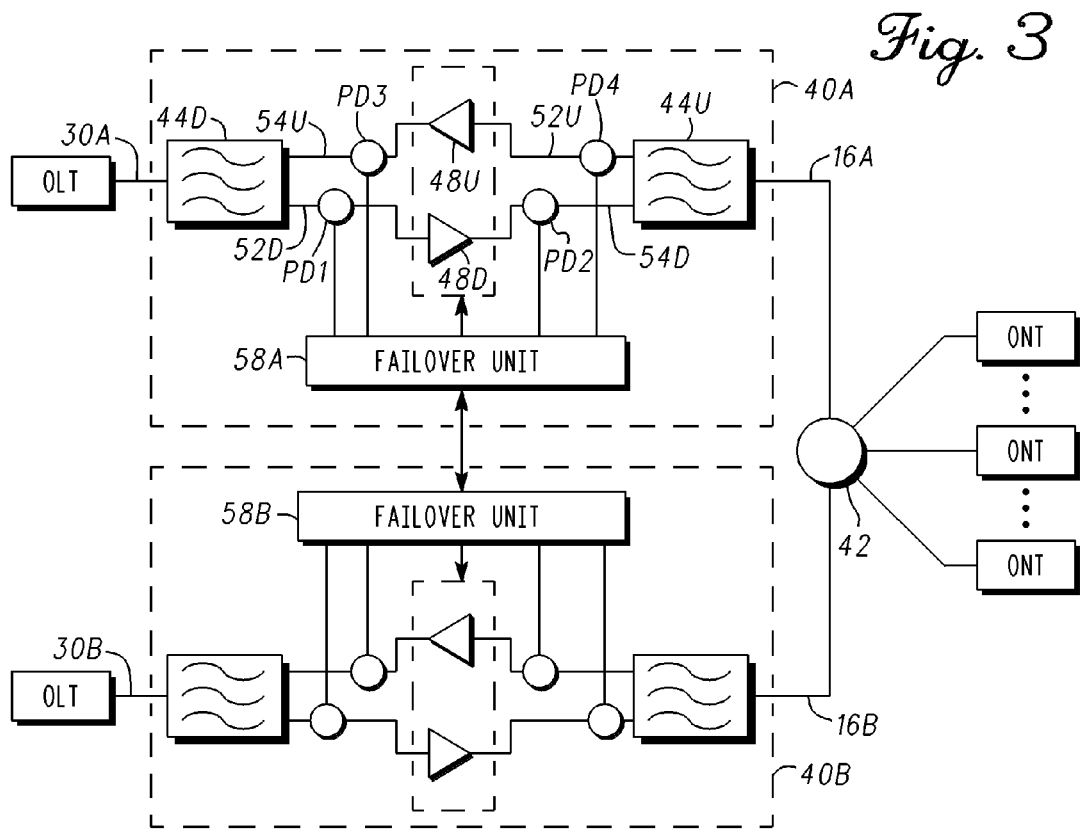
FIG. 3 is a simplified block schematic diagram of a first extended PON in an illustrative embodiment.

FIG. 3 illustrates an extended PON that includes a working entity and a protection entity, and each entity of the working and protection entity pair includes a backhaul fiber 30, an extender 40 and a feeder fiber 16. The feeder fibers are coupled to respective fan-in ports of a 2:N power splitter 42 having fan-out ports connected through distribution and drop fibers to respective ONTs. The two OLTs, of the working and protection entities respectively, may be collocated or distant. The working and protection entity pair implement a 1+1 protection scheme, i.e. a protection scheme that carries productive traffic in the working entity or the protection entity but not both at the same time.

As shown in FIG. 3, each extender 40A, 40B comprises wavelength division multiplexers (WDMs) 44D and 44U that are connected to the backhaul fiber 30A, 30B and feeder fiber 16A, 16B respectively. The downstream signal passes from the backhaul fiber to the feeder fiber via the WDM 44D, a fiber segment 52D, a gain element 48D, a fiber segment 54D and the WDM 44U. The upstream signal passes from the feeder fiber 16 to the backhaul fiber 30 via the WDM 44U, a fiber segment 52U, a gain element 48U, a fiber segment 54U and the WDM 44D. We will assume for the purpose of this discussion that the gain elements are SOAs.

The extenders also comprise respective failover units 58A, 58B. In one embodiment, each extender is implemented on a single printed circuit board and the two extender boards are mounted in a common chassis. Generally, the chassis will accommodate multiple pairs of extender boards. In another embodiment, one or more pairs of extenders are implemented on a single printed circuit board, Each extender includes current sources (not shown) for supplying bias current to the SOAs. The current sources are controlled by signals provided by the failover unit of the extender.

Monitor photodetectors PD1, PD2, PD3 and PD4 are optically coupled to the fiber segments 52D, 54D, 52U and 54U respectively. In an illustrative embodiment, a photodetector may be coupled to its monitored fiber segment by utilizing a three-port passive optical coupler inserted in the path between the WDM and the SOA. The photodetectors generate current signals that depend on the optical signal power level in the respective fiber segments. Each failover unit may be implemented by a computer, as described in greater detail below, and includes adapters that receive the current signals generated by the photodetectors, convert the current signals to voltage form, digitize the voltage signals and supply the digitized voltage signals to the computer for processing. The computer determines whether an optical signal is present on the backhaul and feeder fibers, and is able to measure the gain of the gain elements. A failover unit may also be implemented in hard-wired logic devices instead of a computer. However, in the following discussion, the failover unit is implemented in a computer.

The failover unit defines six operating states for the extender.

Cold: The extender is new and unconfigured
Stand-alone: Extender operation is stand-alone (unprotected)
Working: The extender is the working extender of a protection pair, and is operational
Protection: The extender is the protection extender of a protection pair, and is in warm standby condition.
Standby: The extender is the working extender of a protection pair, but is in warm standby condition due to the working extender having declared a fault or failure
Failover: The extender is the protection extender of a protection pair, but is operational due to the working extender having declared a fault or failure The computer maintains a database that stores the current operating state of the extender as a protection state variable.

The Stand-alone operating state is not pertinent to the disclosed subject matter and will not be discussed further. The Cold, Working and Protection states are considered as the stable states of the system. These are stored in non-volatile memory, such as flash, and persist after power outage.

During normal operation, the working extender is in the Working state and the protection extender is in warm Standby, with no drive current applied to its SOAs. Failover consists of turning off drive current to both SOAs in the old working extender, and turning on drive current to the SOAs in the old protection extender, in that order.

Each failover unit implements a protocol state machine that defines ten states of the extender and the events that cause a transition from one state to another. The states of the protocol are as follows:

P0—Cold
P1—Normal operation—Working
P2—Normal operation—Protection
P3—Failover initiated
P4—Failover ready
P5—Failover not ready
P6—Standby
P7—Protection
P8—Restoral initiated
P9—Restoral ready In its initial condition after manufacture, an extender is not configured as either a protection extender or a working extender. The extender is in Cold condition (i.e. protocol state machine is in state P0 and the extender is in the Cold operating state), and drive current is not applied to either SOA. A technician installs the extender board in the chassis and specifies the slot number of the partner (protection or working) extender in the same chassis and sets the protection state variable to Working or Protection, respectively. The extender transitions to either state P1 or P2, respectively, for the Working and Protection extenders. If the extender transitions to state P1, the SOA drive current is set as configured, e.g., through calibration or operator commands. In addition to starting the protection state machine in a known and non-conflicting state, this also permits SOA operating mode and settings to be configured before starting the extenders. After the operational state of the extender has been set, its state is also stored in flash. In the event of a power outage, the operational state which has been stored in flash is restored after subsequent power-on, the extender transitions to either state P1 or P2, and, if it transitions to state P1, the SOA drive current is set as configured.

During normal operation, the working and protection extenders are in states P1 and P2, respectively. When the working extender enters a downstream or upstream loss-of-signal (LOS) condition or an SOA failure condition (or multiple failure conditions), it sends an Initiate Failover message to the protection extender and enters state P3.

When the protection extender receives an Initiate Failover message while in state P2 or P5, it determines whether an upstream or downstream LOS condition is present. Note that there is no way to determine whether an SOA has failed unless bias current is applied. If neither LOS condition is present, the protection extender sends a Failover Ready message and enters state P4. If either LOS condition is present, the protection extender sends a Failover Not Ready message and enters state P5. When in any state other than P2 or P5, the protection extender ignores an Initiate Failover message. When the working extender is in state P3 and it receives a Failover Ready message, it turns off drive current to both SOAs, sends an Execute Failover message, sets the protection state variable to Standby, and enters state P6. In any state other than P3, the working extender ignores a Failover Ready message.

When the working extender is in state P3 and it receives a Failover Not Ready message, it returns to state P2. In any state other than P3, the working extender ignores a Failover Not Ready message.

When the protection extender is in state P4 and it receives an Execute Failover message, it turns on drive current to both SOAs (as determined by the configured operating mode and gain drive current or output power, respectively), and enters state P7. It also sets the protection state variable to Failover. In any state other than P4, the protection extender ignores an Execute Failover message.

When the protection extender is in state P5, and both upstream and downstream LOS conditions are cleared, it reenters state P2.

When the old working extender (i.e. the extender that was the working extender before failover) is in state P6 and an external signal sets the protection state variable to Restore, if an upstream or downstream LOS condition exists, or if the cause of the failure was an SOA failure or over temperature condition, the old working extender remains in state P6 and keeps the protection state variable in the Standby state. Otherwise, it sends an Initiate Restoral message to the protection extender, enters state P8 and sets the protection state variable to Restore.

When the protection extender receives an Initiate Restoral message while in state P7, it turns off drive current to both SOAs, sends an Execute Restoral message, sets the protection state variable to Protection and returns to state P2. In all other states, the protection extender ignores an Execute Restoral message.

When the working extender receives an Execute Restoral message while in state P8, it turns on drive current to both SOAs (as determined by the configured operating mode and gain drive current or output power, respectively), sets the protection state variable to Working and enters state P1. In any state other than P8, the working extender ignores an Execute Restoral message.

The failover units determine LOS conditions and SOA failure conditions by using the photodetector adapters to sample the time-averaged amplified photocurrent at the respective photodiodes. The presumption is that in normal operation the ones density of the signal is about 50% over the sampling period. This is more likely for the downstream than for the upstream, since the upstream is subject to quiet periods and non-productive polling of ONTs.

Each failover unit has a preset downstream and upstream LOS soak time, i.e. a duration during which the failover unit does not respond to an input signal from a photodetector, in order to protect against initiating failover in response to a transient condition. Typically, the soak time will be of the order of tens of microseconds.

A downstream Loss-of-Signal (LOS) condition is entered when downstream LOS detection is enabled (non-zero downstream LOS soak time), and the downstream received signal at PD 1 is below the configured downstream Receive Power Minimum Threshold during every sample over a period equal to the downstream LOS soak time. Note that the soak times for protection extenders should be somewhat shorter than those for working extenders, in order to ensure that the protection extender detects LOS from a common root cause before an unproductive failover, i.e. a failover that does not eliminate the fault condition. A downstream LOS condition is cleared when the downstream received signal at PD1 is above the configured downstream Receive Power Minimum Threshold during 90% of samples over a period equal to the downstream LOS soak time.

An upstream Loss-of-Signal (LOS) condition is entered when upstream LOS detection is enabled (non-zero upstream LOS soak time), the upstream received signal at PD3 is below the configured upstream Receive Power Minimum Threshold during every sample over a period equal to the upstream LOS soak time, except that upstream LOS is not declared in the event of a downstream LOS or downstream SOA failure, since no ONT will transmit under either of those conditions. Note that the downstream LOS soak time will be shorter than the upstream LOS soak time. In particular, upstream LOS soak time will have to be longer than the longest quiet interval that can be established by the OLT during ranging. In addition, in the event of downstream LOS or amplifier failure, the longer upstream LOS soak time means the protection extender does not declare upstream LOS due solely to the ONTs being silent because of the downstream condition. However, this means that a fault in feeder plant will take longer to restore than a fault in the backhaul. Also note that the soak times for protection extenders should be somewhat shorter than those for working extenders, in order to ensure that the protection extender detects LOS from a common root cause before an unproductive failover. An upstream LOS condition is cleared when the upstream received signal at PD3 is above the configured upstream Receive Power Minimum Threshold during 10% of samples over a period equal to the upstream LOS soak time.

A downstream SOA failure condition is entered when drive current is applied, downstream LOS is not asserted, and downstream transmit signal at PD2 is not greater than the downstream receive signal at PD 1, for a period equal to the SOA failure soak time. It is also entered immediately when the downstream SOA is shut down due to an over temperature condition.

An upstream SOA failure condition is entered when drive current is applied, upstream LOS is not asserted, and upstream transmit signal at PD4 is not greater than the upstream receive signal at PD3, for a period equal to the SOA failure soak time. It is also entered immediately when the downstream upstream SOA is shut down due to an overtemperature condition.

Fail-over occurs when an upstream or downstream LOS or SOA failure condition is entered in the working extender, and neither upstream nor downstream LOS condition is present at the protection extender; this avoids fail-over in the event that the failure is in an element (e.g., ONT power) which is not protected under this scheme, or in the unlikely event of multiple failures. Fail-over may also be initiated manually, e.g, at an element manager.

Restoral after fail-over is typically initiated manually. In some, but not all, cases, it could also be initiated when valid signals upstream are received at the old working extender unit.

In the case of the embodiment described with reference to FIG. 3, in which each extender includes a failover unit, failover control is distributed and the method steps that are executed to accomplish failover control consist of first, determining, e.g., by manual configuration, which of the extender units is the working extender unit and which is the protection extender unit; second, enabling the working extender unit and disabling the protection extender unit; third, at the working extender unit monitoring the upstream and downstream signals and upstream and downstream transmit power; fourth, detecting a fault in either the backhaul fiber, the extender unit or the feeder fiber; fifth, sending a message from the working extender unit to the protection extender unit indicating that a failover is necessary; sixth, at the protection extender unit, determining whether a fault exists in the protection backhaul fiber or protection feeder fiber; seventh, if no such fault exists, sending a message to the working extender unit that the protection extender unit is prepared to failover; eighth, disabling the working extender unit; ninth, sending a message from the working extender unit to the protection extender unit indicating that the failover is in progress; and finally, enabling the protection extender unit.

The failover protocol ensures that failover occurs in a break-before-make fashion, which is needed in order to protect receivers in the event that one SOA in the working extender fails.

Figure 4:
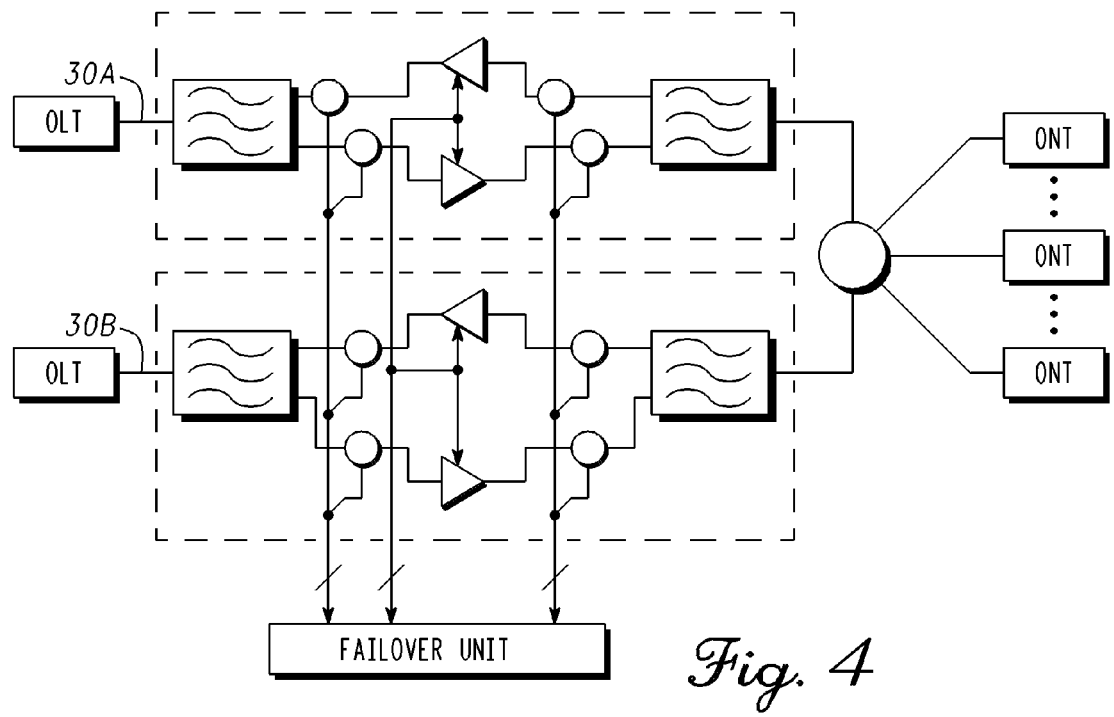
FIG. 4 is a simplified block schematic diagram of a second extended PON in an illustrative embodiment.

FIG. 4 illustrates a second embodiment of the disclosed subject matter, in which failover control is centralized. There is one failover unit for each working-protection pair of extender units, the failover unit being coupled to both extender units. The manner in which the photodetectors are used to detect loss of signal conditions and SOA failure corresponds to that described with reference to FIG. 3, but since a single failover unit controls the state of both extenders, there is no message passing between the extenders.

In the case of centralized control, the method steps that are executed to accomplish failover control consist of first, determining, e.g., by manual configuration, which of the extender units is the working extender unit and which is the protection extender unit; second, enabling the working extender unit and disabling the protection extender unit; third, at the working extender unit monitoring the upstream and downstream signals and upstream and downstream transmit power; fourth, detecting a fault in either the backhaul fiber, the extender unit or the feeder fiber; fifth, at the protection extender unit, determining whether a fault exists in the protection backhaul fiber or protection feeder fiber; seventh, disabling the working extender unit; and, finally, enabling the protection extender unit.

By localizing the problem of fault detection and coordination between the extenders, in both distributed control and centralized control, coordination is significantly simplified. A dedicated communications link is not needed between potentially distant OLTs, and delays in failover due to propagation through the link are eliminated. A fault that affects one direction of transmission in the extender can be detected. This property also helps in fault sectionalization, in that it can determine whether a fault is in the extender unit, in the feeder fiber or in the backhaul fiber.

Figure 5:
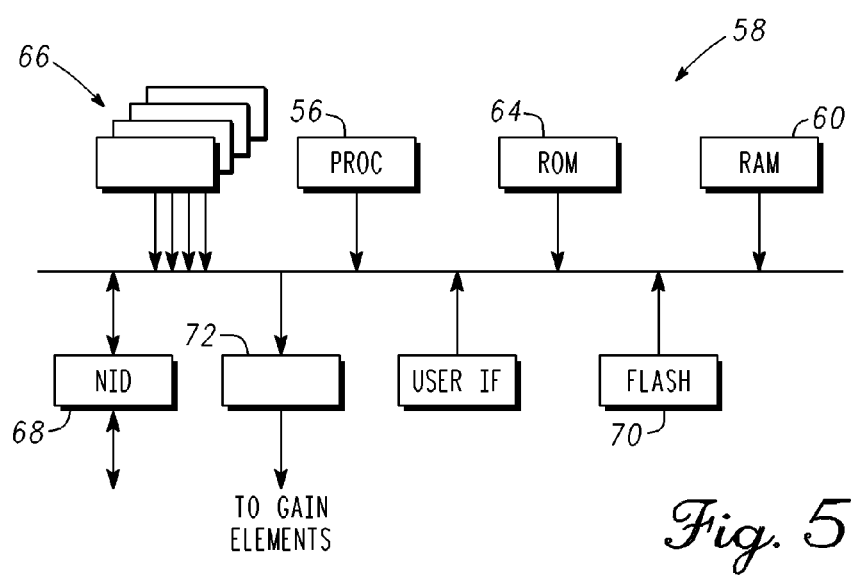
FIG. 5 is a simplified schematic block diagram of a computer that may be used in implementation of an illustrative embodiment.

In an embodiment of the distributed control mechanism described with reference to FIG. 3, each failover unit is implemented by a computer, as mentioned above. Referring to FIG. 5, a suitable computer may comprise a processor 56, random access memory 60, read only memory 64, and various interfaces organized in a generally conventional architecture and communicating via a bus. The interfaces include the adapters 66 that receive the current signals generated by the photodetectors and adapters 70 that provide output signals for selectively enabling and disabling the SOAs depending on the operating state of the extender.

Although FIG. 3 illustrates a direct connection between the failover units of the respective extenders, in an embodiment of the disclosed subject matter the interfaces of each failover unit include a network interface device 68 that is connected to an Ethernet switch and the working and protection extenders communicate over a local area network that serves all the extenders that are installed in the chassis.

The computer may operate in accordance with a program that is stored in a non-volatile computer readable medium, such as flash memory 70, and is loaded into the random access memory 60 for execution. The program is composed of instructions such that when the computer receives signals from the photodetectors PD1, PD2, PD3, PD4 by way of the adapters 66, the computer utilizes suitable resources and functions to provide signals to the partner extender, to control the operating state of the extender and to maintain the database, in the manner described above. When the program causes a transition of an extender from one state to another, the program updates the value of the protection state variable stored in the database. In the event of a power outage, the database can be restored by reading the values from the non-volatile memory of the failover unit.

The network infrastructure includes an element manager that may be located in the central office in which one or both of the OLTs are located, or may be located in a network operations center. The element manager may provide a human interface whereby an extender may be configured, various parameters of the extender may be summoned and viewed, events and alarms may be collected, correlated and displayed, and commands may be issued to the extender. The element manager may further communicate with and provide information to higher level managers. In addition, the housing that contains the chassis in which the extenders are installed also contains two local ONTs that are coupled to the working and protection backhaul fibers, respectively, in the extender. The local ONTs allow the extender units to communicate with the element manager by way of the backhaul fiber and the OLTs. If there are multiple working and protection pairs in the chassis, only one pair of local ONTs need be employed. The local ONTs are connected to the Ethernet switch. Therefore, the extenders are able to communicate with the element manager through the Ethernet switch and the local ONTs, and information regarding the current operating states of the extenders is available to the element manager. The element manager may maintain a database in which the values of the protection state variable for each extender are saved.

Although embodiments have been described with reference to specific devices, such as WDMs and SOAs, it will be appreciated by those skilled in the art that in other embodiments other devices may be used. For example, in other embodiments optical circulators or another form of optical splitter technology may be used instead of the WDMs 34, and as suggested above there are several technologies other than semiconductor optical amplifiers that may be used to implement the functionality of the gain elements 48. Although the drawings illustrate fiber segments 52, 54 coupling the WDMs to the gain elements and photodetectors coupled to the fiber segments for monitoring the optical power passing in the paths defined by the respective fiber segments, in other embodiments other techniques may be used to provide the optical coupling and permit the optical power passing in the respective paths to be monitored. Specifically, the photodetectors could be co-packaged with the gain elements, in which case there would be no fiber between the photodetectors and the respective gain elements; or an optical waveguide formed in a planar silicon/silica structure, for example by etching, may be used instead of a fiber, and in the latter case the three-port coupler may be formed in the same structure.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:
1. Extender apparatus for an optical network, comprising:
a first extender unit having an network-facing port for connection to a first backhaul fiber and a subscriber-facing port for connection to a first feeder fiber and including a first gain assembly, the first extender unit being operable selectively either in an enabled state, in which the first gain assembly amplifies a signal received at either port of the first extender unit and couples it to the other port of the first extender unit, or in a disabled state, in which the first gain assembly blocks coupling of a signal from either port of the first extender unit to the other port of the first extender unit, a second extender unit having an network-facing port for connection to a second backhaul fiber and a subscriber-facing port for connection to a second feeder fiber and including a second gain assembly, the second extender unit being operable selectively either in an enabled state, in which the second gain assembly amplifies a signal received at either port of the second extender unit and couples it to the other port of the second extender unit, or in a disabled state, in which the second gain assembly blocks coupling of a signal from either port of the second extender unit to the other port of the second extender unit, and a failover unit that is operable when the first extender unit is in the enabled state and the second extender unit is in the disabled state to detect occurrence of at least one fault condition in the first extender unit, the failover unit being responsive to said fault condition in the first extender unit to switch the first extender unit to the disabled state and the second extender unit to the enabled state.

2. Extender apparatus according to claim 1, wherein the first extender unit includes photodetectors connected to the failover unit and positioned to detect whether the first gain assembly receives a signal from the network-facing port or from the subscriber-facing port and to detect whether the first gain assembly is providing a signal to the network-facing port or to the subscriber-facing port, and wherein the failover unit is responsive to signals provided by the photodetectors to detect a fault condition in the first extender unit.

3. Extender apparatus according to claim 2, wherein each extender unit comprises a downstream traffic gain element, an upstream traffic gain element, a first backhaul extender medium for communicating downstream traffic from the network-facing port to the downstream traffic gain element, a first feeder extender medium for communicating downstream traffic from the downstream traffic gain element to the subscriber-facing port, a second feeder extender medium for communicating upstream traffic from the subscriber-facing port to the upstream traffic gain element, and a second backhaul extender medium for communicating upstream traffic from the upstream traffic gain element to the network-facing port.

4. Extender apparatus according to claim 3, comprising first and second photodetectors for detecting traffic on the first and second backhaul extender fibers media, and third and fourth photodetectors for detecting traffic on the first and second feeder extender media.

5. Extender apparatus according to claim 4, wherein the failover unit is connected to receive signals provided by the photodetectors and configured to interpret the signals provided by the photodetectors as indicating normal operation of the first extender unit or a fault condition in the first extender unit, and to respond to an indication of a fault condition by switching the first extender unit to the disabled state and the second extender unit to the enabled state.

6. Extender apparatus according to claim 5, wherein the failover unit includes a computer connected to receive said signal provided by the photodetectors and programmed to interpret said signals as indicating normal operation or a fault condition.

7. Extender apparatus according to claim 1, wherein the failover unit comprises first and second failover modules incorporated in the first and second extender units respectively, the first and second failover modules being in communication with each other.

8. Extender apparatus according to claim 1, wherein the first gain assembly comprises a downstream traffic gain element and an upstream traffic gain element, and at least one of the upstream traffic gain element and the downstream traffic gain elements is an optical amplifier.

9. Extender apparatus according to claim 1, wherein the first gain assembly comprises a downstream traffic gain element and an upstream traffic gain element, and at least one of upstream traffic gain element and the downstream traffic gain element is an optical-electrical-optical regenerator.

10. Extender apparatus according to claim 1, wherein the failover unit is responsive to clearing of said fault condition in the first extender unit to switch the second extender unit to the disabled state and the first extender unit to the enabled state.

11. An optical network comprising:

first and second backhaul fibers each having an network-facing end for coupling to an optical line termination and also having a subscriber-facing end, first and second feeder fibers each having a subscriber-facing end for coupling to at least one optical network termination and also having an network-facing end, first and second extender units having respective network-facing ports coupled to the downstream ends of the first and second backhaul fibers respectively and respective subscriber-facing ports coupled to the upstream ends of the first and second feeder fibers respectively, and each extender unit including a gain assembly and being operable selectively either in an enabled state, in which the gain assembly amplifies a signal received at either port of the extender unit and couples it to the other port of the extender unit, or in a disabled state, in which the gain assembly blocks coupling of a signal from either port of the extender unit to the other port of the extender unit, and a failover unit that is operable when the first extender unit is in the enabled state and the second extender unit is in the disabled state to detect occurrence of at least one fault condition in the first extender unit, the failover unit being responsive to said fault condition in the first extender unit to switch the first extender unit to the disabled state and the second extender unit to the enabled state.

12. An optical network according to claim 11, wherein the failover unit comprises first and second failover modules incorporated in the first and second extender units respectively, the first and second failover modules being in communication with each other.

13. An optical network according to claim 11, further comprising an optical power splitter having two fan-in ports coupled to the subscriber-facing ends of the feeder fibers respectively and also having a plurality of fan-out ports, a plurality of optical network terminations, and a plurality of distribution fibers coupling the fan-out ports to the optical network terminations respectively.

14. An optical network according to claim 11, wherein the failover unit is responsive to clearing of said fault condition in the first extender unit to switch the second extender unit to the disabled state and the first extender unit to the enabled state.

* * * * *